US009003888B2

(12) United States Patent
Lopez et al.

(10) Patent No.: US 9,003,888 B2
(45) Date of Patent: Apr. 14, 2015

(54) AREAL MONITORING USING DISTRIBUTED ACOUSTIC SENSING

(75) Inventors: Jorge Louis Lopez, Bellaire, TX (US); Peter Berkeley Wills, Calgary (CA); Jeffery Joseph Mestayer, Kingwood, TX (US)

(73) Assignee: Shell Oil Company, Houston, TX (US)

( * ) Notice: Subject to any disclaimer, the term of this patent is extended or adjusted under 35 U.S.C. 154(b) by 901 days.

(21) Appl. No.: 13/148,437

(22) PCT Filed: Oct. 15, 2009

(86) PCT No.: PCT/US2009/060767
§ 371 (c)(1),
(2), (4) Date: Sep. 16, 2011

(87) PCT Pub. No.: WO2010/090660
PCT Pub. Date: Aug. 12, 2010

(65) Prior Publication Data
US 2012/0024051 A1 Feb. 2, 2012

Related U.S. Application Data

(60) Provisional application No. 61/150,842, filed on Feb. 9, 2009.

(51) Int. Cl.
G01V 8/16 (2006.01)
(52) U.S. Cl.
CPC ........................................ G01V 8/16 (2013.01)
(58) Field of Classification Search
USPC .................................. 73/643, 152.51, 152.54
See application file for complete search history.

(56) References Cited

U.S. PATENT DOCUMENTS

| 4,965,773 A | 10/1990 | Marschall ........................ 367/15 |
| 5,194,847 A | 3/1993 | Taylor et al. ................... 340/557 |

(Continued)

FOREIGN PATENT DOCUMENTS

| GB | 2364380 | 1/2002 |
| WO | 2009056855 | 5/2009 |

(Continued)

OTHER PUBLICATIONS

Clay Kirkendall, "Distributed Acoustic and Seismic Sensing", IEEE, Optical Fiber Communication Conference and Exposition National Fiber Optic Engineers Conference, published Mar. 2007, pp. 1-3.*

*Primary Examiner* — Laura Martin
*Assistant Examiner* — Rose M Miller (57) ABSTRACT

A method for obtaining seismic information about a subsurface formation using at least one fiber optic cable having its proximal end coupled to a light source and a photodetector comprises: transmitting into the cable at least one light pulse; receiving at the photodetector a first and second light signals indicative of the physical status of at least one first cable section and at least one second cable section, respectively, wherein the first and second sections are selected so as to provide first and second information items, respectively; optionally, further processing at least one of the first and second information items so as to produce derivative information; and outputting at least one of the first, second, and derivative information items to a display; wherein the second item differs from the first item in at least one aspect selected from the group consisting of: resolution, area, and location.

35 Claims, 4 Drawing Sheets

26: signal processing center
28: optional second photodetector

(56) References Cited

U.S. PATENT DOCUMENTS

| | | | |
|---|---|---|---|
| 6,072,567 A * | 6/2000 | Sapack | 356/32 |
| 6,268,911 B1 | 7/2001 | Tubel et al. | |
| 6,271,766 B1 | 8/2001 | Didden et al. | 340/853.1 |
| 6,302,204 B1 * | 10/2001 | Reimers et al. | 166/250.03 |
| 6,588,266 B2 | 7/2003 | Tubel et al. | |
| 6,787,758 B2 | 9/2004 | Tubel et al. | |
| 7,040,390 B2 | 5/2006 | Tubel et al. | |
| 7,201,221 B2 | 4/2007 | Tubel et al. | |
| 7,284,903 B2 | 10/2007 | Hartog | |
| 7,668,411 B2 | 2/2010 | Davies et al. | |
| 7,740,064 B2 | 6/2010 | McCoy et al. | |
| 7,946,341 B2 | 5/2011 | Hartog et al. | |
| 7,954,560 B2 | 6/2011 | Mathiszik et al. | |
| 2003/0205083 A1 * | 11/2003 | Tubel et al. | 73/152.19 |
| 2004/0043501 A1 | 3/2004 | Means et al. | |
| 2007/0205000 A1 * | 9/2007 | Hosie et al. | 166/374 |
| 2008/0008031 A1 | 1/2008 | Vigen et al. | 367/15 |
| 2009/0114386 A1 * | 5/2009 | Hartog et al. | 166/250.08 |
| 2009/0188665 A1 | 7/2009 | Tubel et al. | |
| 2010/0107754 A1 * | 5/2010 | Hartog et al. | 73/152.47 |
| 2010/0200743 A1 * | 8/2010 | Forster et al. | 250/254 |
| 2010/0200744 A1 * | 8/2010 | Pearce et al. | 250/268 |
| 2010/0207019 A1 | 8/2010 | Hartog et al. | |
| 2010/0315630 A1 | 12/2010 | Ramos et al. | |
| 2011/0044574 A1 | 2/2011 | Strong | |
| 2011/0069302 A1 | 3/2011 | Hill et al. | |
| 2011/0088462 A1 | 4/2011 | Samson et al. | |
| 2011/0088910 A1 | 4/2011 | McCann et al. | |
| 2011/0149688 A1 | 6/2011 | Hill et al. | |
| 2011/0185815 A1 | 8/2011 | McCann | |
| 2011/0216996 A1 | 9/2011 | Rogers | |
| 2011/0280103 A1 | 11/2011 | Bostick, III | |
| 2011/0292763 A1 | 12/2011 | Coates et al. | |
| 2012/0017687 A1 | 1/2012 | Davis et al. | |
| 2012/0018149 A1 | 1/2012 | Fidan et al. | |

FOREIGN PATENT DOCUMENTS

| | | |
|---|---|---|
| WO | 2009158630 | 12/2009 |
| WO | 2010010318 | 1/2010 |
| WO | 2010034986 | 4/2010 |
| WO | 2010136764 | 12/2010 |
| WO | 2010136810 | 12/2010 |
| WO | 2011010110 | 1/2011 |
| WO | 2011039501 | 4/2011 |
| WO | 2011058312 | 5/2011 |
| WO | 2011058313 | 5/2011 |
| WO | 2011058314 | 5/2011 |
| WO | 2011058322 | 5/2011 |
| WO | 2011067554 | 6/2011 |
| WO | 2011076850 | 6/2011 |
| WO | 2011079107 | 6/2011 |
| WO | 2011141537 | 11/2011 |
| WO | 2011148128 | 12/2011 |

* cited by examiner

FIG. 1
(Prior Art)

26: signal processing center
28: optional second photodetector

26: signal processing center

28: optional second photodetector

FIG. 4

26: signal processing center

28: optional second photodetector

AREAL MONITORING USING DISTRIBUTED ACOUSTIC SENSING

RELATED CASES

This case is a national stage entry of PCT/US2009/060767 filed 15 Oct. 2009, which claims priority from U.S. Provisional Application 61/150,842, filed 9 Feb. 2009, both of which are incorporated by reference.

FIELD OF THE INVENTION

The invention relates to a method of investigating a reservoir region in a subsurface formation using seismic data. More particularly, the present invention relates to the use of fiber optic cables to provide a system of distributed acoustic sensors that can be actively configured so as to optimize information gained by the investigation.

BACKGROUND OF THE INVENTION

Seismic surveys are useful for studying subsurface formations in many contexts, including the monitoring of subsurface hydrocarbon reservoirs and the tracking of fluids, e.g. oil, gas, or water, as they flow through the subsurface strata. One type of areal monitoring that is gaining in importance is the ability to track $CO_2$ that has been injected as part of carbon capture and sequestration (CCS) projects. Also of interest in the context of subsurface monitoring are the various fluids that are used for enhanced oil recovery (EOR), hydrocarbon saturation, fraccing operations, and the like.

Conventional seismic monitoring is typically multi-dimensional, with three dimensions relating to the spatial characteristics of the earth formation. Typically two dimensions are horizontal length dimensions, while the third relates to depth in the earth formation, which can be represented by a length coordinate, or by a time coordinate such as the two-way travel time of a seismic wave from surface to a certain depth and back. In addition, seismic data are often also acquired for at least two points in time, providing a fourth dimension. This allows changes in the seismic properties of the subsurface to be studied as a function of time. Changes in the seismic properties over time may be due to, for example, spatial and temporal variation in fluid saturation, pressure and temperature.

Seismic monitoring techniques investigate subsurface formations by generating seismic waves in the earth and measuring the time the waves need to travel between one or more seismic sources and one or more seismic receivers. The travel time of a seismic wave is dependent on the length of the path traversed, and the velocity of the wave along the path.

Figure 1:
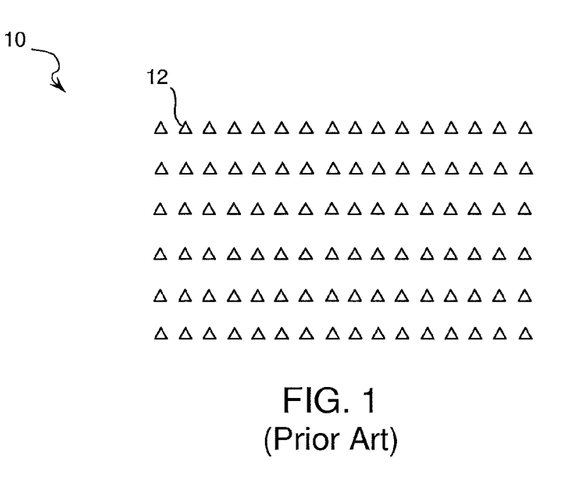
FIG. 1 is a schematic illustration of a prior art system.

A typical system includes several acoustic receivers deployed across the region of interest. It is not uncommon to use hundreds or even thousands, of acoustic sensors to collect data across a desired area, as illustrated in FIG. 1. The seismic data-containing acoustic signals recorded by the seismic sensors, including reflections from the various layers in a subsurface formation, are known as traces. The recorded acoustic signals are analyzed to derive an indication of the geology in the subsurface. In order to maximize repeatability and therefore sensitivity, the sensors are ideally left in place for the duration of the monitoring period.

Conventional areal seismic monitoring of oil or gas fields has at least two disadvantages. First, it is relatively expensive to acquire, deploy and maintain the large numbers of geophones or hydrophones that are needed in order to monitor a large area for the time periods that are typically involved, which may be on the order of years. Second, because of the transient nature of certain subsurface features, such as fluid flows, the configuration in which the sensors were originally deployed may be suboptimal or even ineffective over time.

For these reasons, it is desirable to provide an areal seismic monitoring system that is inexpensive to acquire, deploy, and maintain, and which can be modified as-needed to optimize data collection with respect to a changing region of interest. Specifically, a changing region of interest may include a part of the subsurface that is of greater importance in improving production of hydrocarbons or because it is undergoing change in acoustic properties as compared to other regions or because it requires different seismic sampling spacing (spatial or temporal) in contrast with other regions.

SUMMARY OF THE INVENTION

The present invention provides an areal seismic monitoring system that is inexpensive to acquire, deploy, and maintain, and can be modified as-needed to optimize data collection with respect to a changing subsurface region of interest.

Because of the adaptability of the present system, it can be used to efficiently collect information in various ways. By way of example only, the system can be used to collect one or more items of information in one configuration and one or more items of information in a second configuration, and the first and second configurations can be selected such that the second item(s) of information differ from the first item(s) of information in one aspect selected from the group consisting of: resolution, coverage area, location, and time. An item of information can be based on one received signal or on a plurality of received signals. Further, an item of information can comprise one or more pieces of data, so that, for example, an item of information can comprise data relating to the physical status of each of a plurality of sections along the length of the cable at a single point in time.

In certain embodiments, the invention provides a method for obtaining information about a subsurface formation from acoustic signals that contain information about the subsurface formation, using at least one fiber optic cable deployed within acoustic range of the subsurface formation, the proximal end of the fiber optic cable being coupled to a light source and to a proximal photodetector, and the fiber optic cable being acoustically coupled to the subsurface formation so as to allow the acoustic signals to affect the physical status of the cable. The method comprises a) transmitting into the cable at least one light pulse; b) receiving at the photodetector a first light signal indicative of the physical status of at least one first section of the cable, wherein the first section is selected so the first light signal provides a first item of information about the subsurface formation; c) receiving at the photodetector a second light signal indicative of the physical status of at least one second section of the cable, wherein the second section is selected so that the second light signal provides a second item of information about the subsurface formation; d) optionally, further processing at least one of the first and second items of information so as to produce derivative information; and e) outputting at least one of the first item of information, the second item of information, and the derivative information to a display, wherein the second item of information differs from the first item of information in at least one aspect selected from the group consisting of: resolution, area, and location.

The second item of information may further differ from the first item of information in time. The fiber optic cable may be at the surface or in a borehole and one or a plurality of cables may be used. On the surface or in a borehole, the cable may occupy an area (as defined herein) greater than 0.5 square kilometer. If step d) is present, it may include processing the first and second items of information so as to yield virtual source data, or it may include processing at least one of the first and second items of information so as to produce an image selected from the group of 2D or 3D surface seismic images, 2D or 3D ocean bottom or marine seismic images, 2D or 3D VSP seismic images, cross-well seismic images, and microseismic analysis.

Steps a) through e) may be repeated over time, so as to generate time-lapse data.

The generated information may be temporarily stored in a memory buffer and only permanently stored in response to an actuating signal.

The resolution of the second item of information may be at least ten times greater than the resolution of the first item of information.

The received acoustic signals are preferably selected from the group consisting of reflected waves, refracted waves, shear waves, compressional waves, surface waves, Love waves, and guided waves.

BRIEF DESCRIPTION OF THE DRAWINGS

For a more detailed understanding of the invention, reference is made to the accompanying drawings wherein.

As used herein, the term "surface" refers to the earth's surface and in marine applications to the seafloor. Items "at the surface" are acoustically coupled to the earth by direct or indirect physical contact with the surface, such as by being laid on the surface or by being placed in shallow trenches, as opposed to being placed beneath the surface, such as in a borehole.

As used herein, the term "area" refers to an areal amount of the surface or subsurface that is sensed by a cable or section of fiber optic cable. For a cable at the surface, the area is determined at the surface, with the boundaries of the area being established by an imaginary line drawn on the surface so as to enclose the cable or section of cable. In the case of a subsurface cable, the area is determined on an imaginary plane parallel to the surface, on which the path of a subsurface cable is projected, with the boundaries of the area being established by an imaginary line drawn on the plane so as to enclose the projection the cable or section of cable on the plane.

DETAILED DESCRIPTION OF A PREFERRED EMBODIMENT

Referring initially to FIG. 1, an array 10 of conventional acoustic sensors 12 may be deployed as shown. The number of sensors available to cover the desired area is typically limited by cost; once the number of available sensors is established, the sensors are deployed. Sensors may also be deployed in vertical or horizontal boreholes at intermediate depths between the surface and the formations of interest. For on-shore applications, the sensors may be deployed manually, such as by using a GPS system to place each sensor in a desired location, or they may be installed at the bottom of purposely drilled shallow boreholes. For offshore applications, the sensors, referred to as Ocean Bottom Seismometers (OBS) may be deployed by remotely operated vehicle (ROV) and placed on the seabed at desired locations, or they may be deployed in cabled configurations with fixed inter-sensor spacings via Ocean Bottom Cables (OBC) laid on the seabed.

Regardless of the mode or manner of deployment, it is frequently desired to acquire data having more resolution than is available. Without additional sensors, it is impossible to collect such data.

The present invention provides the ability to collect data in a manner that allows for much higher resolution. In addition, the present system has the ability to be both adaptable and/or programmable. According to preferred embodiments of the present invention, a fiber optic cable is connected to a light transmission source disposed at a proximal end of the cable. The light source transmits at least one light pulse into the end of the fiber optic cable. The cable may be double-ended, i.e. may be bent in the middle so that both ends of the cable are at the source, or it may be single-ended, with one end at the source and the other end at a point that is remote from the source. The length of the cable can range from a few meters to several kilometers, or even hundreds of kilometers. In either case, measurements can be based solely on backscattered light, if there is a light-receiving means only at the source end of the cable, or a light receiving means can be provided at the second end of the cable, so that the intensity of light at the second end of the fiber optic cable can also be measured.

Figure 2:
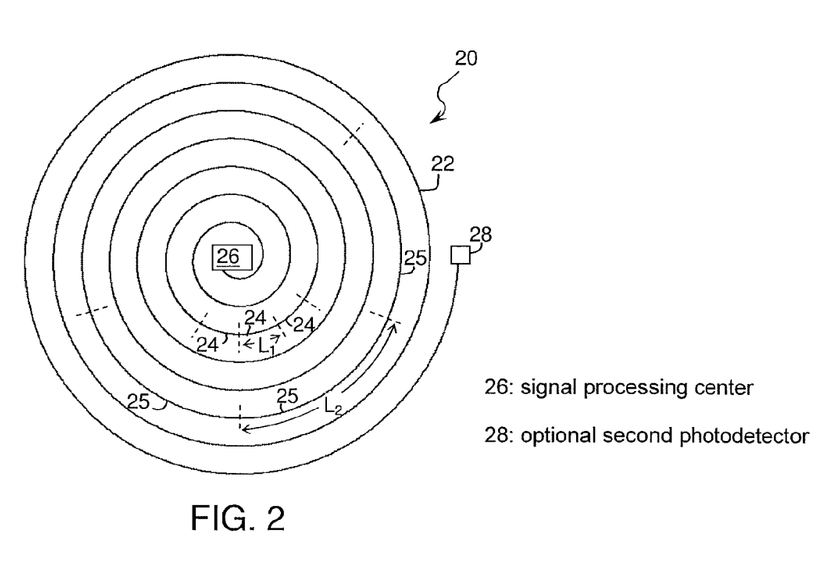
FIG. 2 is a schematic illustration of a system constructed in accordance with a first embodiment of the invention.

In one embodiment, a single long cable is deployed over the area to be monitored. A first embodiment of the inventive system 20 is shown in FIG. 2 and includes a single fiber optic cable 22 deployed in a spiral. While FIG. 2 shows cable 22 in the form of an Archimedes spiral, in which the radius increases constantly, it will be recognized that other spiral shapes, including those in which the radius increases geometrically or otherwise, can be used, and may in fact be preferable in some instances. Cable 22 is preferably a strand of single-mode optical fiber connected to a signal processing center 26. Signal processing center 26 includes a light source (not shown) arranged to introduce an optical signal into an input end of cable 22 and a proximal photodetector (not shown) arranged to detect radiation that has been reflected or backscattered within cable 22 back toward the input end and to generate an output signal in response to the detected radiation.

Figure 6:
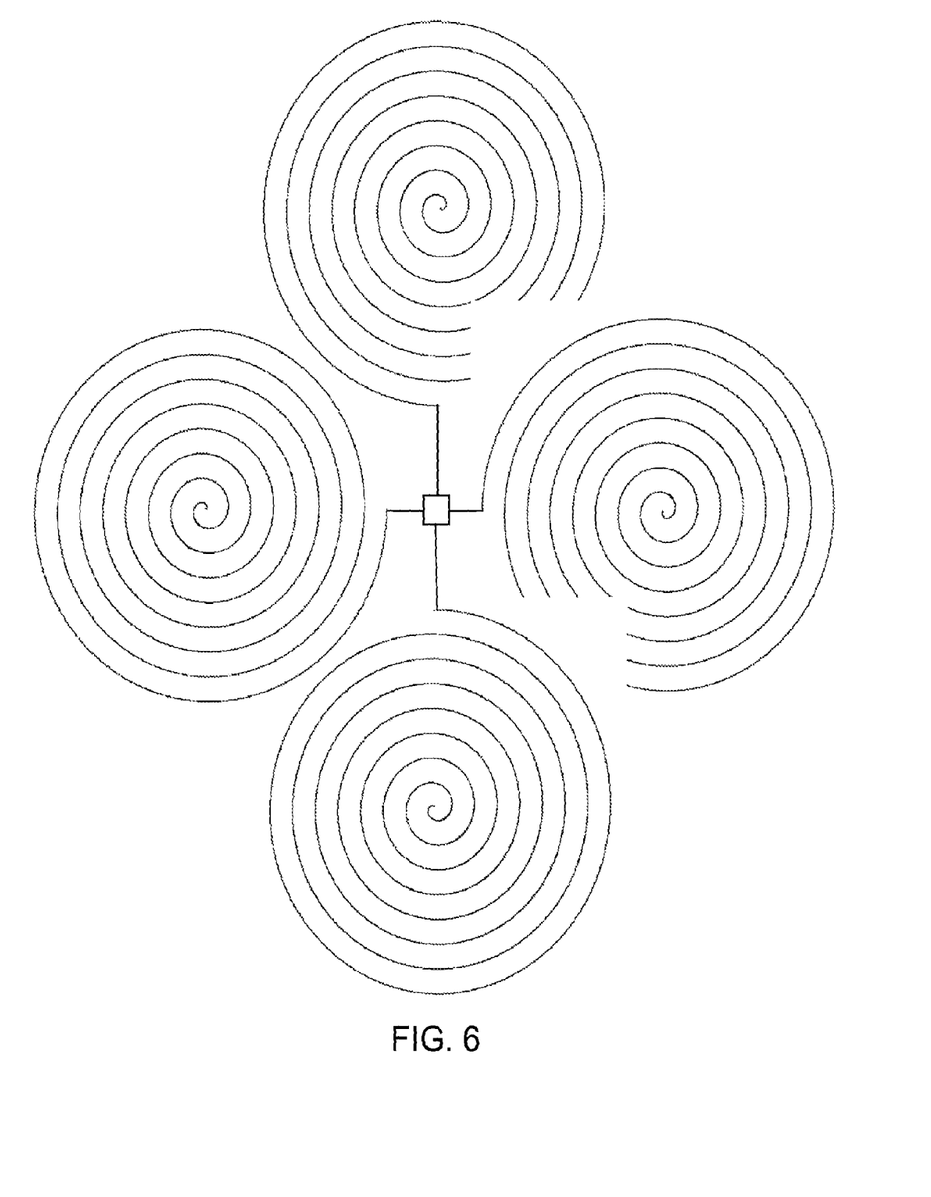
FIG. 6 is a schematic illustration of a system constructed in accordance with a second embodiment of the invention.

A light source may be configured to provide light pulses into one or more cables, while a photodetector is preferably provided for each cable. As illustrated, cable 22 can be arranged so that it extends radially outwardly from signal processing center 26 in a spiral, but it will be understood that one or more cables can be arranged in any other suitable arrangement, such as the multi-spiral configuration shown in FIG. 6, a grid, a serpentine configuration, or any other suitable configuration. If cable 22 is disposed in a borehole, the borehole may follow any desired trajectory, including spiral or other, and some embodiments may include a plurality of cables 22 in a plurality of boreholes.

Cable 22 is preferably acoustically coupled to the subsurface formation, so that acoustic signals travelling from the region of interest can affect the physical status of the cable. By altering the physical status of the cable, the acoustic signals create a localized or semi-localized change in the backscattering properties of the cable, which in turn can be sensed by a photodetector. Using techniques that are known in the art, the optical signals received from the cable can be used to extract information about the position and magnitude of the incoming acoustic signal(s).

In some embodiments, the light source is a long coherence length phase-stable laser and is used to transmit direct sequence spread spectrum encoded light down the fiber. Acoustic vibrations or other disruptions cause small changes to the fiber, which in turn produce changes in the backscattered light signal. The returning light signal thus contains both information about the acoustic vibration and location information indicative of where along the fiber sound impacted the fiber. The location of the acoustic signal along the fiber can be determined using the spread spectrum encoding, which uniquely encodes the time of flight along the length of the fiber.

Using optical time domain reflectometry (OTDR) technology, it is possible to determine an amount of backscattered light arriving from any point along fiber optic cable 22. Although the duration of the light pulse determines the lower limit on the spatial resolution, the resulting signal can be used to extract information at any larger interval. This can be accomplished by dividing the backscattered light signal into a series of bins in time. The data within each bin is summed to give information about the average strain on the length of fiber between the endpoints of the bin. These bins can be made arbitrarily large to sample longer sections of the fiber. The bins may be equally sized and continuously spread over the entire length of the fiber with the end of one bin becoming the start of the next, but if desired, the size and position of each bin, in addition to the spacing between consecutive bins, can be tailored to yield the optimum desired spatial sampling resolution. This programmably distributed sensing allows maximum resolution sampling along intervals of high interest without over-sampling regions of lower interest.

Thus, by time-gating the received backscattered signal, cable 22 can be treated as a plurality of discrete acoustic "sensors," with each sensor corresponding to a section of cable. The time-gating can be controlled to produce sections/sensors that are as long or as short as desired. Referring again to FIG. 2, for example, one portion of cable 22 can sense at high resolution, using relatively short sections of cable having lengths $L_1$, as shown at 24, while another portion of cable 22 can sense at a lower resolution, using relatively long sections of cable having lengths $L_2$, as shown at 25. In some embodiments, higher-resolution section length $L_1$ is preferably 0.5 to 10 m and lower-resolution section length $L_2$ is preferably 10 to 1000+ m.

One example of a suitable technology is a system called Blue Rose. This system exploits the physical phenomenon of Rayleigh optical scattering, which occurs naturally in optical fibers used traditionally for optical time domain reflectometry (OTDR) techniques. Blue Rose detects backscattered light and uses the signal to give information about acoustic events caused by activities near the cable. The sensor is a single strand of single-mode optical fiber with an elastomeric coating that is buried in the ground at a depth of approximately nine inches. Alternatively, coherent OTDR(C-OTDR) processes can be used to obtain similar acoustic information from an optical system, as disclosed in US Application No. 20090114386.

Fiber optic cable 22 can be deployed on or near the earth's surface or beneath the surface, such as in a borehole. Using the approach described above, cable 22 can be used to sense acoustic signals (vibrations) from naturally occurring events, induced subsurface events, or active seismic sources at or beneath the surface. In addition, data collected from the present system can be processed to simulate data from "virtual sources," as is known in the art, or the system can be used to record signals from virtual sources.

One advantage of an adaptable fiber optic acoustic sensing system is that it allows the dynamic range of the system to be varied. Specifically, by varying the length or brightness (laser power) of the light pulse, it is possible to tailor the sensitivity of the system to acoustic signals of different amplitudes. This may be advantageous in environments where the amplitude of the expected acoustic signals spans a range that is larger than could be sensed using conventional equipment.

Still referring to FIG. 2, cable 22 may have an optional second photodetector 28 disposed at its remote end. Remote photodetector 28 preferably communicates with the signal processing center 26 via wireless signal or other suitable means. If present, remote photodetector 28 will receive light that has been transmitted along the length of the cable. The level or intensity of light received by remote photodetector 28 can be compared to a base level, where the base level is preferably the intensity that is received at remote photodetector 28 when the system is in normal operation with no disturbance to the fiber optic cable 22.

In one embodiment, signal processing center 26 continuously samples the amount of backscattered light at each section along the fiber optic cable 22 and compares the backscattered light intensity with a previous sample to determine whether a sufficient change in backscattered light intensity has occurred and if so, at which point(s). This approach is useful for detecting disturbances to the fiber, but can generate volumes of data that are impractical to handle, particularly if the sections are relatively short.

Thus, in another embodiment, sensing and location of backscattered light may be actuated by a detection of a change in light intensity at the remote photodetector 28. Because it allows the storage of smaller volumes of data, this approach may be advantageous in cases where there are limitations on the volume of data that can be collected or processed. It is expected that many acoustic events will last long enough to be sensed by the system post-actuation. If it is desirable to ensure that no early-event data is lost, a continuously refreshing memory buffer can be used to store the backscattered light from fiber optic cable 22, only transferring sets of data to a permanent medium when actuated by detection of a change in light in photodetector 28.

In other embodiments, the system can be programmed to increase the resolution of the sampling when actuated by detection of a change in light in photodetector 28.

In still other embodiments, one or more cable sections can be used as monitoring devices, so that the system modifies its resolution in one or more areas or stores data from a memory buffer in response to a change in signal from one or more of the designated monitoring device sections. Thus, for example, if a very large sensing system is used, it may be desirable to designate a subset of the possible sensing sections as monitoring sections and to alter the sensing density in the vicinity of a particular sensing section in response to a change in the signal received from that section.

The flexibility of each acoustic sensing cable can be leveraged to build an areal seismic recording network with programmable spatial distribution that provides optimal resolution when adapted to focus on regions of interest. Regions of interest may relate to fluid presence, pressure, or temperature fronts as these evolve over time due to production, CCS, EOR, or other processes. In an exemplary embodiment, programmably distributed sensing with finely spaced sensors could be employed in areas where reservoir processes are varying rapidly in a lateral sense, while coarse distributions could be employed elsewhere. The sensor interrogation program and effective sensor distribution pattern can be adapted to follow areas of interest as production evolves through time.

In still other embodiments, it may be desirable to record with two different resolutions when the subsurface includes both shallow and deep objectives or objectives that are near to and distant from the cable.

Figure 3:
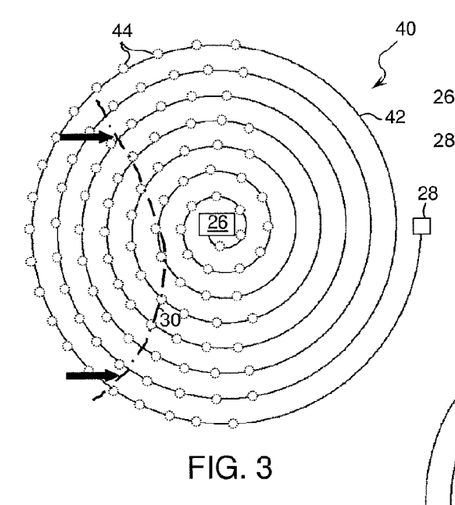
FIGS. 3-5 are schematic illustrations of a system in accordance with invention in use over a time interval.
Figure 4:
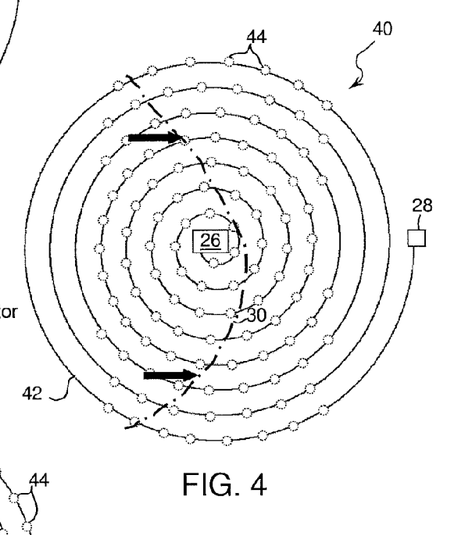
Figure 5:
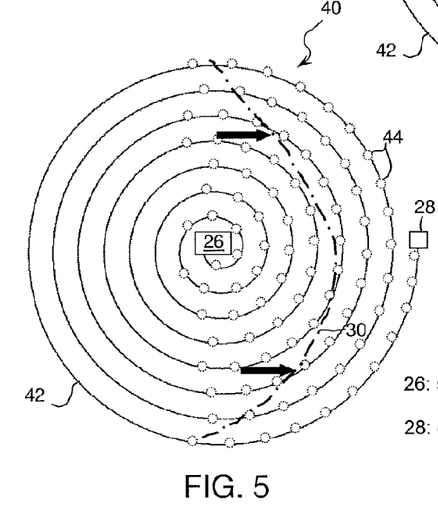

Still further embodiments of the invention lighten the data storage and processing load by sensing only desired portions of the fiber and varying the portions that are sensed. An example of such a system is shown in FIGS. 3-5, in which a system 40 is dynamically monitored to track the movement of a fluid front 30 as it traverses the system from left to right as-drawn, as indicated by the arrows. In sequential FIGS. 3-5, phantom indicators 44 represent sections of cable 42 that are selected for sensing. Once the location of fluid front 30 has been established, sensing can be limited to sections 44 that lie in the vicinity of the front. As the front moves across the sensing area, the selection of sections for sensing also shifts, with some sections ceasing to be interrogated and interrogation of some sections being initiated, so as to maintain a high resolution image of the front without unnecessary data sampling. In this embodiment both the amount (area) of coverage and the location of the sensing may be varied.

Figure 7:
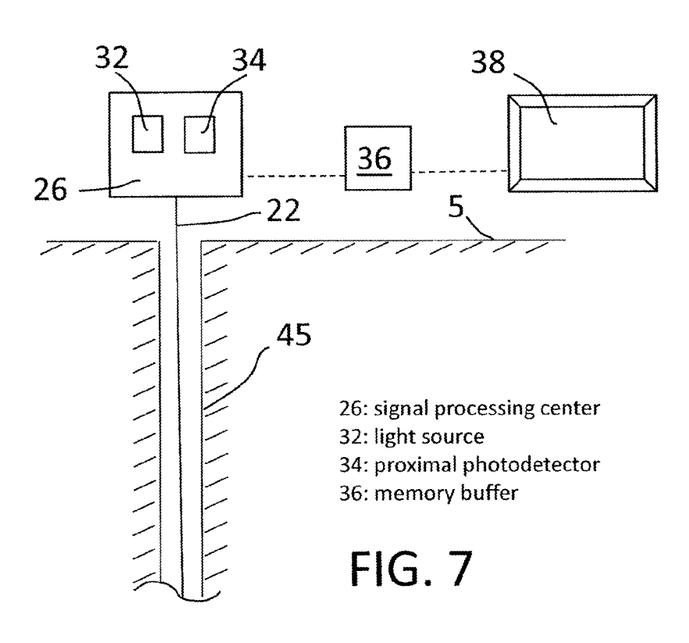
FIG. 7 is a schematic illustration of a fiber optic cable in a borehole.

FIG. 7 schematically shows the fiber optic cable 22 deployed in a borehole 45 beneath the surface 5. The borehole 45 may follow any desired trajectory, including spiral or other, and some embodiments may include a plurality of cables 22 in a plurality of boreholes 45. Cable 22 is connected to the signal processing center 26. Signal processing center 26 includes a light source 32 arranged to introduce the optical signal into the input end of cable 22, and a proximal photodetector 34 arranged to detect radiation that has been reflected or backscattered within cable 22 back toward the input end and to generate the output signal. The photodetector 34 receives a first light signal indicative of the physical status of at least one first section of the cable 22, and a second light signal indicative of the physical status of at least one second section of the cable 22. As explained above, the first light signal provides the first item of information and the second light signal provides the second item of information. The first item of information may be stored in a memory buffer 36. At least one of the first item of information, the second item of information, and optional derivative information is outputted to a display 38.

In other embodiments, the invention can provide variable time resolution of a sensor network that is distributed in space. In this case, spatial resolution is maximized everywhere in the field but an acceptable time resolution, for example 1 week, is selected and data with high spatial resolution is time-multiplexed to provide information from the entire network at discrete time steps. Both spatial and temporal resolution are preferably independently variable and programmable.

The adaptable sensor network may be disposed in conventional 2D or 3D recording geometries, such as on or near the surface for surface seismic acquisition, near the seabed for ocean bottom marine acquisition, and in the water for marine acquisition. In some environments, it may be sufficient to lay the optical cable on the earth's surface, while in other environments it may be preferable to bury the cable in a shallow trench in order to enhance its acoustic coupling to the earth. The adaptable sensor network may also be installed in vertical, deviated, or horizontal boreholes for downhole seismic acquisition. These boreholes may be dedicated observation wells or production-related wells. Installation of the network is envisioned to be on a permanent basis, to maximize coupling to the formation and to reduce data acquisition costs.

The present adaptable monitoring system can record acoustic signals generated by seismic energy sources that can be placed on the surface, in the water, or in boreholes, or can be passive in nature (microseismic). The monitoring systems that would result from such combination of sources and adaptable sensor networks includes all known geometries, such as 2D or 3D surface seismic, 2D or 3D ocean bottom or marine seismic, 2D or 3D VSP seismic, cross-well seismic, microseismic monitoring in boreholes or at surface from hydraulic fracturing or EOR processes, etc. Likewise, the present system can be used to monitor all propagation modes, including reflection and refraction (shear and compressional) waves, surface waves, Love waves and other guided modes. When the fiber optic cables are deployed downhole in horizontal wells, such configurations enable the use of virtual source seismic techniques, which are useful for reservoir monitoring under complex overburden.

To maximize the benefits of sensor network adaptability, the present system preferably has high along-fiber resolution (e.g. ~1 m for fine spacing and up to 100 m for coarse spacing). For areal monitoring applications, the optical fibers are preferably arranged in patterns such that the sensor network covers the subsurface maximally, for example gridded or spiral patterns on shallow trenches. Spiral-shaped boreholes may also be used.

The adaptability of the present system is also advantageous when the sensing environment is constrained or changes. For example, in systems where it is not possible to place actual sensors in all desired locations, because of physical obstacles or the like, the present system can be programmed to adapt to the lack of sensor presence by providing increased sampling density at points adjacent to the obstacle. Data from these points can be processed to give information about the obstructed area. In other instances, obstacles or disruptions in the desired sensing area may occur over the life of the sensing system, such as, for example, the construction of surface facilities within the sensing area. In such cases, the disrupted portion of the cable can be re-routed around the obstacle and the remaining portions of the cable can be reprogrammed to optimize the data gathered in the new configuration.

In other embodiments, a system such as that described in U.S. Application No. 2008277568 can be used. That system uses pulsed pairs of light signals that have different frequencies and are separated in time. If used, such a system allows processing of the signal to be carried out more easily and with a greater signal-to noise ratio than is the case if radiation of a single frequency backscattered from different positions along the length of optical fiber is used to generate a signal at a photodetector by interferometery.

Compared to previous technologies for areal seismic monitoring, the invention allows relatively large areas to be monitored, e.g. several square kilometers at a relatively low cost. Furthermore the length of fiber is passive and therefore requires no maintenance.

While the present invention has been described in terms of the preferred embodiments, it will be understood that various modifications thereto can be made without departing from the scope of the invention, as set out in the claims that follow. By way of example only, one of skill in the art will recognize that the number and configuration of cables and sensors, the sampling rate and frequencies of light used, and the nature of the cable, coupling devices, light sources and photodetectors can all be modified.

The invention claimed is:

1. A method for obtaining information about a subsurface formation from acoustic signals that contain information about the subsurface formation, using at least one fiber optic cable deployed within acoustic range of the subsurface formation, said fiber optic cable having a proximal end and a remote end, said proximal end being coupled to a light source and to a proximal photodetector, said fiber optic cable being acoustically coupled to the subsurface formation so as to allow the acoustic signals to affect the physical status of the cable, the method comprising:
   a) transmitting into the cable at least one light pulse;
   b) receiving at the photodetector a first light signal indicative of the physical status of at least one first section of the cable, wherein said first section is selected so the first light signal provides a first item of information about the subsurface formation;
   c) receiving at the photodetector a second light signal indicative of the physical status of at least one second section of the cable, wherein said second section is selected so that the second light signal provides a second item of information about the subsurface formation; and
   e) outputting at least one of the first item of information and the second item of information to a display;
      wherein the second item of information differs from the first item of information in resolution.

2. The method according to claim 1 wherein the second item of information further differs from the first item of information in time.

3. The method according to claim 1 wherein the cable is at the surface.

4. The method according to claim 3 wherein the cable occupies an area greater than 0.5 square kilometer.

5. The method according to claim 1 wherein the cable is in a borehole.

6. The method according to claim 5 wherein the cable occupies a desired area.

7. The method according to claim 1 where the first item of information is stored in a memory buffer and only permanently stored in response to an actuating signal.

8. The method according to claim 1 wherein the resolution of the second item of information is at least ten times greater than the resolution of the first item of information.

9. The method according to claim 1 wherein the first and second items of information are gathered concurrently and the second item of information differs from the first item of information in resolution and location.

10. The method according to claim 1 wherein the acoustic signals are selected from the group consisting of reflected waves, refracted waves, shear waves, compressional waves, surface waves, Love waves, and guided waves.

11. A method for obtaining information about a subsurface formation from acoustic signals that contain information about the subsurface formation, using at least one fiber optic cable deployed within acoustic range of the subsurface formation, said fiber optic cable having a proximal end and a remote end, said proximal end being coupled to a light source and to a proximal photodetector, said fiber optic cable being acoustically coupled to the subsurface formation so as to allow the acoustic signals to affect the physical status of the cable, the method comprising:
   a) transmitting into the cable at least one light pulse;
   b) receiving at the photodetector a first light signal indicative of the physical status of at least one first section of the cable, wherein said first section is selected so the first light signal provides a first item of information about the subsurface formation;
   c) receiving at the photodetector a second light signal indicative of the physical status of at least one second section of the cable, wherein said second section is selected so that the second light signal provides a second item of information about the subsurface formation;
   d) further processing at least one of the first and second items of information so as to produce derivative information; and
   e) outputting at least one of the first item of information, the second item of information, and the derivative information to a display;
wherein the second item of information differs from the first item of information in resolution.

12. The method according to claim 11 wherein the second item of information further differs from the first item of information in time.

13. The method according to claim 11 wherein the cable is at the surface.

14. The method according to claim 13 wherein the cable occupies an area greater than 0.5 square kilometer.

15. The method according to claim 11 wherein the cable is in a borehole.

16. The method according to claim 15 wherein the cable occupies a desired area.

17. The method according to claim 15 wherein step d) includes processing the first and second items of information so as to yield virtual source data.

18. The method according to claim 17 including repeating steps a) through e) over time.

19. The method according to claim 17 wherein the cable occupies a desired area.

20. The method according to claim 11 where the first item of information is stored in a memory buffer and only permanently stored in response to an actuating signal.

21. The method according to claim 11 wherein the resolution of the second item of information is at least ten times greater than the resolution of the first item of information.

22. The method according to claim 11 wherein the first and second items of information are gathered concurrently and the second item of information differs from the first item of information in resolution and location.

23. The method according to claim 11 wherein step d) includes processing at least one of the first and second items of information so as to produce an image selected from the group of 2D or 3D surface seismic images, 2D or 3D ocean bottom or marine seismic images, 2D or 3D VSP seismic images, cross-well seismic images, and microseismic analysis.

24. The method according to claim 23 wherein the first and second items of information are separated in time.

25. The method according to claim 11 wherein the acoustic signals are selected from the group consisting of reflected waves, refracted waves, shear waves, compressional waves, surface waves, Love waves, and guided waves.

26. A method for obtaining information about a subsurface formation from acoustic signals that contain information about the subsurface formation, using at least one fiber optic cable deployed in a borehole within acoustic range of the subsurface formation, said fiber optic cable having a proximal end and a remote end, said proximal end being coupled to a light source and to a proximal photodetector, said fiber optic cable being acoustically coupled to the subsurface formation so as to allow the acoustic signals to affect the physical status of the cable, the method comprising:
   a) transmitting into the cable at least one light pulse;
   b) receiving at the photodetector a first light signal indicative of the physical status of at least one first section of the cable, wherein said first section is selected so the first light signal provides a first item of information about the subsurface formation;
   c) receiving at the photodetector a second light signal indicative of the physical status of at least one second section of the cable, wherein said second section is selected so that the second light signal provides a second item of information about the subsurface formation;

d) further processing at least one of the first and second items of information so as to produce derivative information; and e) outputting at least one of the first item of information, the second item of information, and the derivative information to a display;

wherein the second item of information differs from the first item of information in at least one aspect selected from the group consisting of: resolution, area, and location, and wherein step d) includes processing the first and second items of information so as to yield virtual source data.

27. The method according to claim 26 wherein the second item of information further differs from the first item of information in time.

28. The method according to claim 26 wherein the cable occupies a desired area.

29. The method according to claim 26 including repeating steps a) through e) over time.

30. The method according to claim 26 where the first item of information is stored in a memory buffer and only permanently stored in response to an actuating signal.

31. The method according to claim 26 wherein the resolution of the second item of information is at least ten times greater than the resolution of the first item of information.

32. The method according to claim 26 wherein the first and second items of information are gathered concurrently and the second item of information differs from the first item of information in resolution and location.

33. The method according to claim 26 wherein step d) includes processing at least one of the first and second items of information so as to produce an image selected from the group of 2D or 3D surface seismic images, 2D or 3D ocean bottom or marine seismic images, 2D or 3D VSP seismic images, cross-well seismic images, and microseismic analysis.

34. The method according to claim 33 wherein the first and second items of information are separated in time.

35. The method according to claim 26 wherein the acoustic signals are selected from the group consisting of reflected waves, refracted waves, shear waves, compressional waves, surface waves, Love waves, and guided waves.

* * * * *